(12) United States Patent
Perreux

(10) Patent No.: US 11,199,034 B2
(45) Date of Patent: Dec. 14, 2021

(54) SYSTEM FOR OPENING/CLOSING A BONNET

(71) Applicant: RENAULT s.a.s., Boulogne Billancourt (FR)

(72) Inventor: Philippe Perreux, L'Etang la Ville (FR)

(73) Assignee: RENAULT s.a.s., Boulogne Billancourt (FR)

( * ) Notice: Subject to any disclaimer, the term of this patent is extended or adjusted under 35 U.S.C. 154(b) by 347 days.

(21) Appl. No.: 15/320,167

(22) PCT Filed: May 22, 2015

(86) PCT No.: PCT/FR2015/051356
§ 371 (c)(1),
(2) Date: Jan. 17, 2017

(87) PCT Pub. No.: WO2015/193571
PCT Pub. Date: Dec. 23, 2015

(65) Prior Publication Data
US 2017/0122013 A1    May 4, 2017

(30) Foreign Application Priority Data

Jun. 20, 2014 (FR) .................................... 1455699

(51) Int. Cl.
*E05C 3/04* (2006.01)
*E05B 83/24* (2014.01)
*B62D 25/12* (2006.01)

(52) U.S. Cl.
CPC .............. *E05C 3/046* (2013.01); *E05B 83/24* (2013.01); *B62D 25/12* (2013.01); *E05B 83/247* (2013.01); *E05Y 2900/536* (2013.01)

(58) Field of Classification Search
CPC ........ E05C 3/046; E05B 83/24; E05B 83/247; E05Y 2900/536; B62D 25/12
See application file for complete search history.

(56) References Cited

U.S. PATENT DOCUMENTS 1,631,508 A * 6/1927 Wagner ................. E05B 83/247
    292/214
1,692,558 A * 11/1928 McBride ............... E05B 83/247
    70/240
2,723,552 A * 11/1955 Dlugatch .................. F16B 1/00
    70/240

(Continued)

FOREIGN PATENT DOCUMENTS

GB          1281399 A       7/1972

OTHER PUBLICATIONS

International Search Report dated Jul. 21, 2015, in PCT/FR2015/051356 filed May 22, 2015.

(Continued)

*Primary Examiner* — Kristina R Fulton
*Assistant Examiner* — Thomas L Neubauer
(74) *Attorney, Agent, or Firm* — Oblon, McClelland, Maier & Neustadt, L.L.P.

(57) ABSTRACT

A system for opening and closing a vehicle hood includes a manual maneuvering element that is able to control positioning of the hood on a vehicle body and a mechanism for locking and unlocking the maneuvering element.

11 Claims, 7 Drawing Sheets

(56) References Cited

U.S. PATENT DOCUMENTS

| | | | | | |
|---|---|---|---|---|---|
| 2,743,601 | A | * | 5/1956 | Dlugatch | E05B 83/24 70/240 |
| 2,873,991 | A | * | 2/1959 | Larimore | B65D 45/16 292/241 |
| 3,010,749 | A | * | 11/1961 | Brissette | E05B 83/16 292/27 |
| 3,199,322 | A | | 8/1965 | Braun et al. | |
| 3,347,071 | A | * | 10/1967 | Solow | E05B 83/24 70/240 |
| 5,046,768 | A | * | 9/1991 | Myslicki | E05B 83/24 292/68 |

OTHER PUBLICATIONS

French Search Report dated Jan. 23, 2015, in French Patent Application FR 1455699 filed Jun. 20, 2014.

* cited by examiner

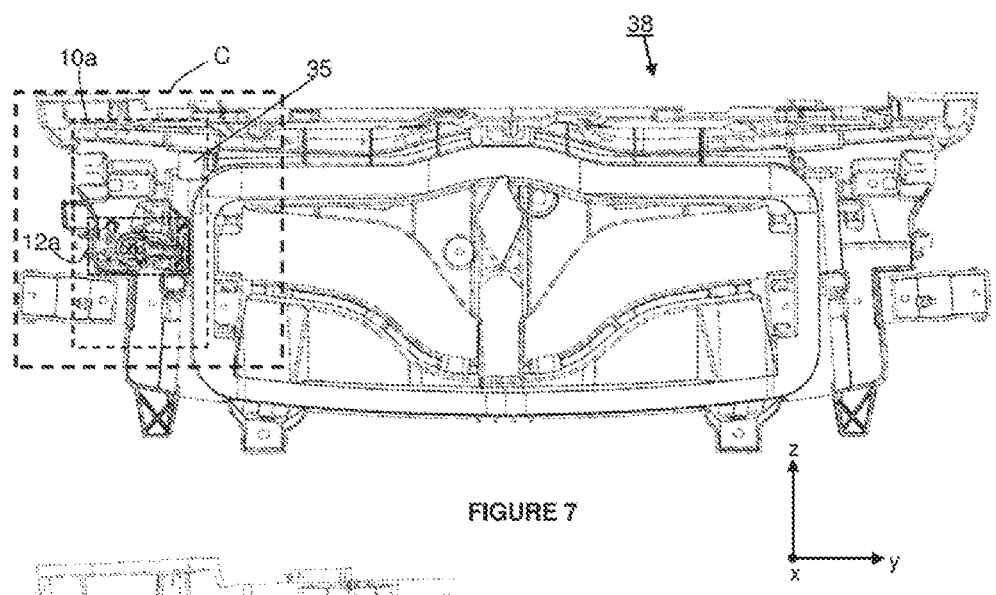
FIGURE 7
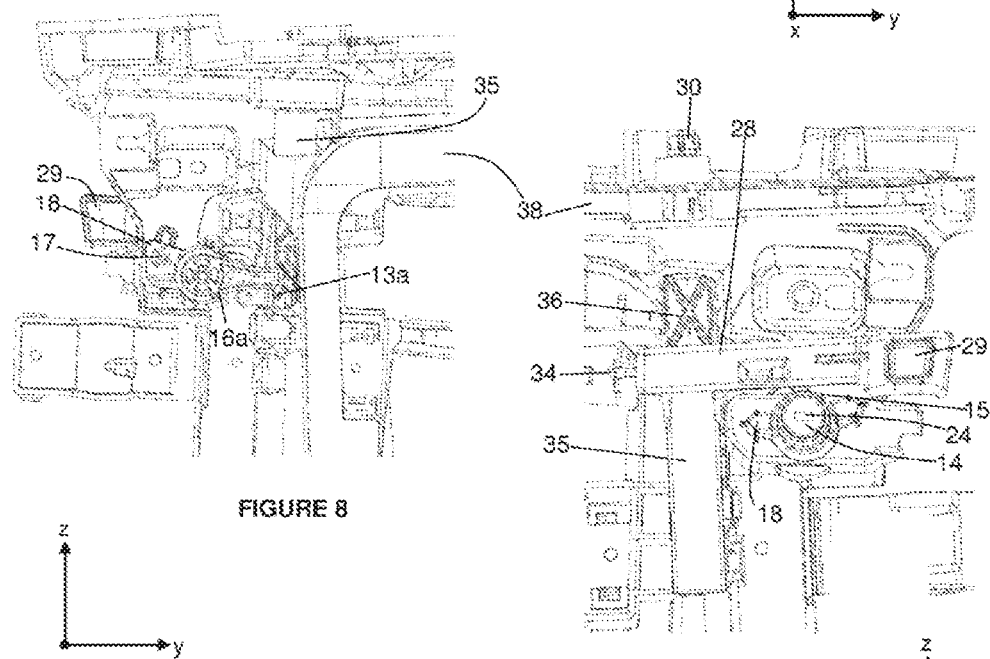
FIGURE 8
FIGURE 6

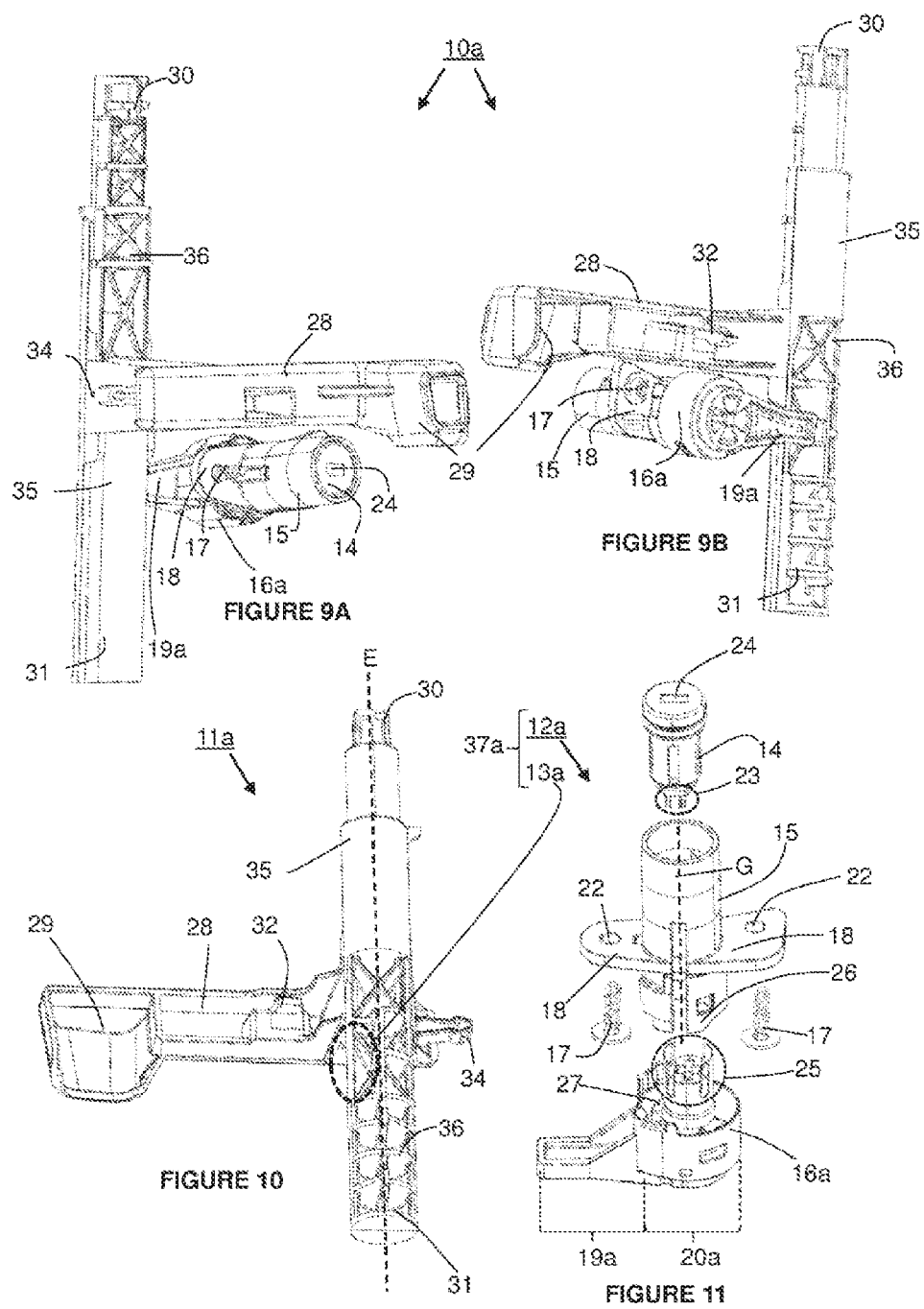

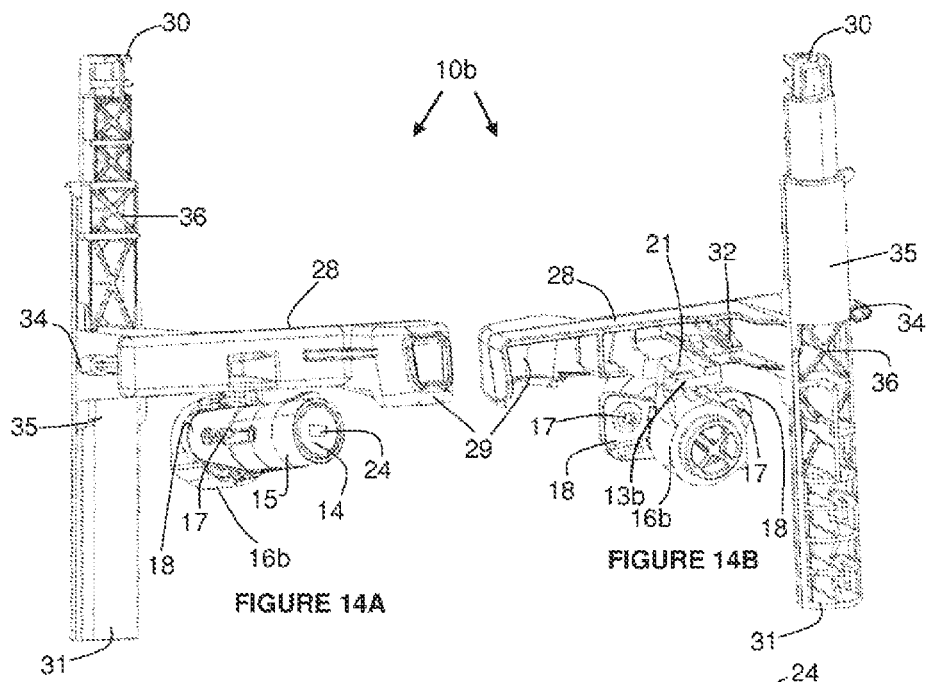
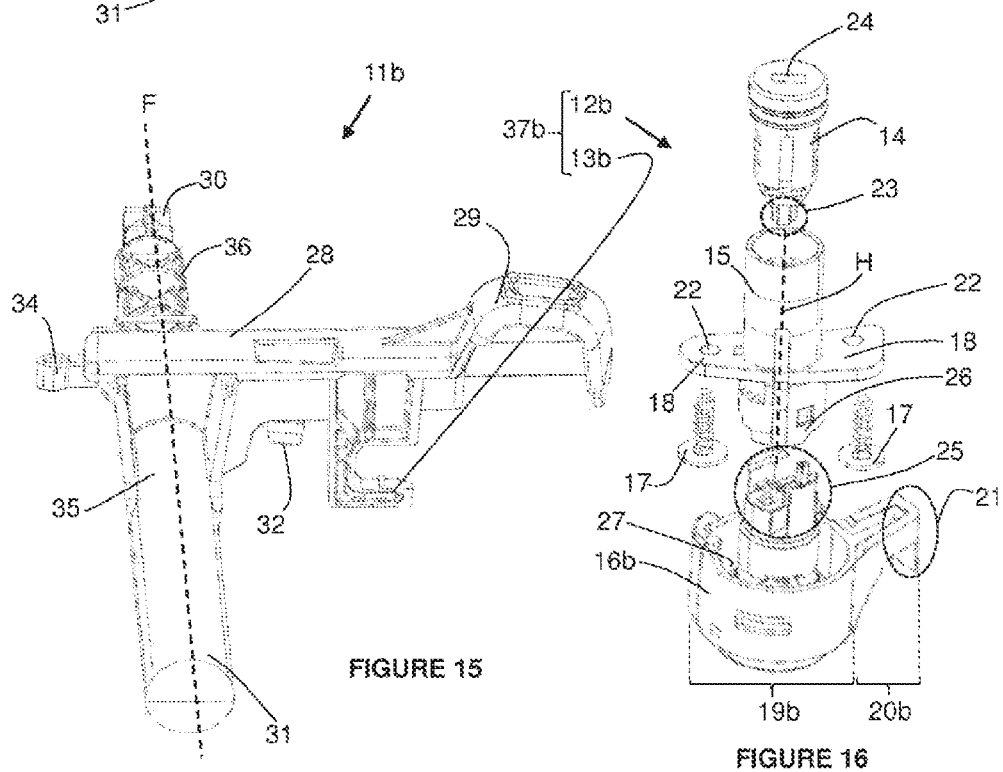

SYSTEM FOR OPENING/CLOSING A BONNET

BACKGROUND

The present invention relates to a system for opening/closing a vehicle hood comprising a manual maneuvering element, especially movable by rotation.

The invention also relates to a vehicle comprising such an opening/closing system.

In the prior art illustrated in FIGS. 1A, 1B, 2A and 2B, such systems for opening/closing a vehicle hood 1 are used at the level of a front part of the vehicle. These opening/closing systems generally comprise an actuating element 3 and at least one drive element 2 (two in this case).

By manipulation of actuating element 3, which may correspond to a lever, drive element 2 is able to vary in position by rotation and then to bring about blocking of the hood on the vehicle body (FIGS. 1A and 1B) or conversely unblocking of the hood from the body (FIGS. 2A and 2B).

To accomplish this, drive element 2 is equipped with a cam surface 4 configured to cooperate with a bracing element 7 integral with hood 1 in such a way as to drive the sliding of hood 1 toward the rear of the vehicle by causing the insertion of latching lugs 5 of hood 1 into retaining seats 6 of a hood support 9, in the case for the example of blocking of hood 1 on the vehicle body. In the case of unblocking of hood 1, actuating element 3 is manipulated in such a way that drive element 2 can no longer be braced on bracing element 7 and so it permits sliding of hood 1 toward the front of the vehicle.

However, one of the major inconveniences of such opening/closing systems is that they do not have a sufficient safeguard for protecting access to the compartment covered by the hood. In fact, by simple manipulation of the actuating element of these opening/closing systems, an ill-intentioned individual is then able to access this compartment with ease.

In addition, such non-secured opening/closing systems are contrary to the commercial or insurance regulations or requirements in some countries, where a system demonstrating inviolability of the compartment under the hood must be provided.

BRIEF SUMMARY

The object of the present invention is to remedy all or part of the different inconveniences cited in the foregoing.

To this end, the invention relates to a system for opening/closing a vehicle hood comprising a manual maneuvering element, especially movable by rotation, which is able to control the positioning of the hood on a vehicle body, wherein the system comprises a mechanism for locking/unlocking the maneuvering element.

In other embodiments:
- the manual maneuvering element comprises a member provided with an actuating element, especially a lever;
- the locking/unlocking mechanism comprises a first part and a second part, which are able to cooperate with one another to assure blocking of the said manual maneuvering element;
- a first part of the locking/unlocking mechanism comprises a connecting module, a movable arm and a device for control of the said movable arm;
- the manual maneuvering element and a connecting module are mounted in a structural element, especially a bulkhead reinforcement of the vehicle;
- a connecting module is able to connect a movable arm and a control device to a structural element of the vehicle;
- a second part of the locking/unlocking mechanism comprises a stop incorporated at the level of an actuating element of the manual maneuvering element;
- a movable arm is provided with a free end that is curved, and
- a stop incorporated on an actuating element has a U-shape complementary to that of the free end of a movable arm.

The invention also relates to a vehicle comprising such a system for opening/closing a hood.

BRIEF DESCRIPTION OF THE DRAWINGS

Other advantages and characteristics of the invention will become more apparent by reading the description hereinafter of two preferred embodiments with reference to the figures, provided by way of indicative and non-limitative example:

FIG. 6 is a larger-scale view of a part A of FIG. 3 according to the embodiments of the invention;

FIG. 7 is a view of a rear face of the structural element of the vehicle comprising the system for opening/closing the hood according to the first embodiment of the invention;

FIG. 8 is a larger-scale view of a part C of FIG. 7 according to the first embodiment of the invention;

FIG. 9A is a view of a front face of the opening/closing system according to the first embodiment of the invention;

FIG. 9B is a view of a rear face of the opening/closing system according to the first embodiment of the invention;

FIG. 10 is a view of a rear face of a manual maneuvering element of the opening/closing system according to the first embodiment of the invention;

FIG. 11 is an exploded view of a first part of a mechanism for locking/unlocking the opening/closing system according to the first embodiment of the invention;

FIG. 14A is a view of a front face of the opening/closing system according to the second embodiment of the invention;

FIG. 14B is a view of a rear face of the opening/closing system according to the second embodiment of the invention;

FIG. 15 is a view of a front face of a manual maneuvering element of the opening/closing system according to the second embodiment of the invention; and FIG. 16 is an exploded view of a first part of a mechanism for locking/unlocking the opening/closing system according to the second embodiment of the invention,

DETAILED DESCRIPTION

The description is written with reference to an orthonormal coordinate system (X, Y, Z) traditionally associated with a motor vehicle, in which X is the front-to-rear longitudinal direction of the vehicle, positive toward the front, Y is the right-to-left transversal direction that is horizontal and perpendicular to X, positive toward the right, and Z is the vertical direction, positive upward.

In the embodiments of the invention, opening/closing system 10a, 10b of the hood is mounted in a structural element 38 of the vehicle. This structural element 38 corresponds, for example, to a bulkhead reinforcement, which is illustrated in FIGS. 3 to 8, 12 and 13.

This structural element 38 is provided to be incorporated at the level of the front part of the vehicle. It is able to cooperate in non-limitative manner with a radiator grille, a front bulkhead and/or the hood of the vehicle.

Figure 1A:
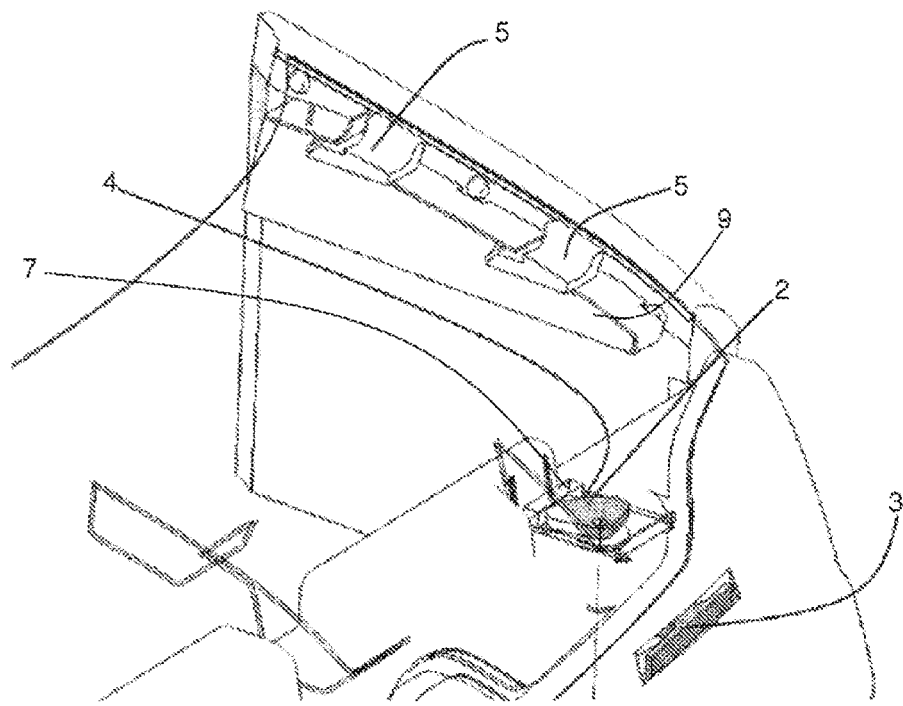
FIGS. 1A, 1B, 2A and 2B represent a front part of a vehicle using a prior art system for opening/closing a hood.
Figure 1B:
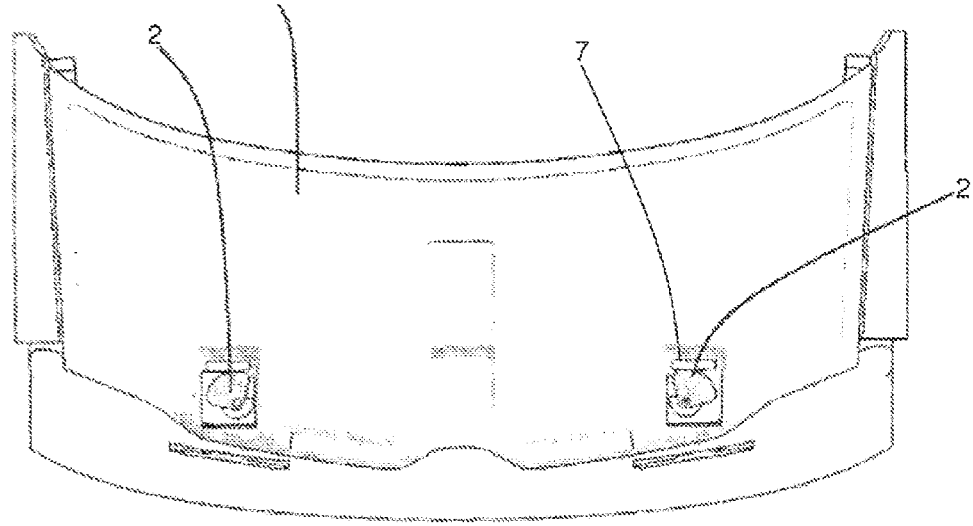
Figure 2A:
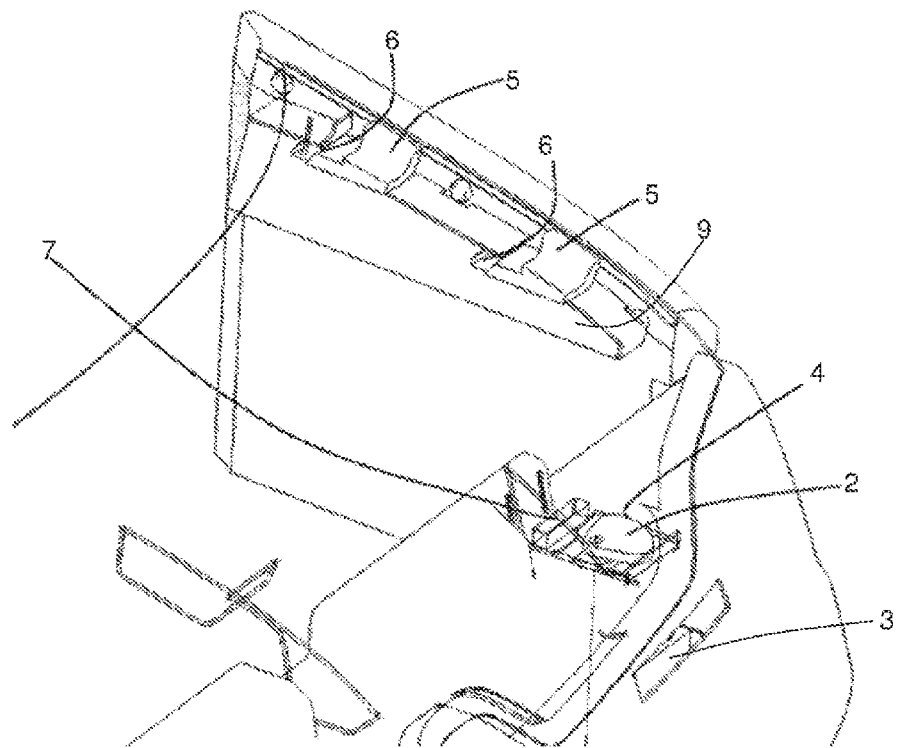
Figure 2B:
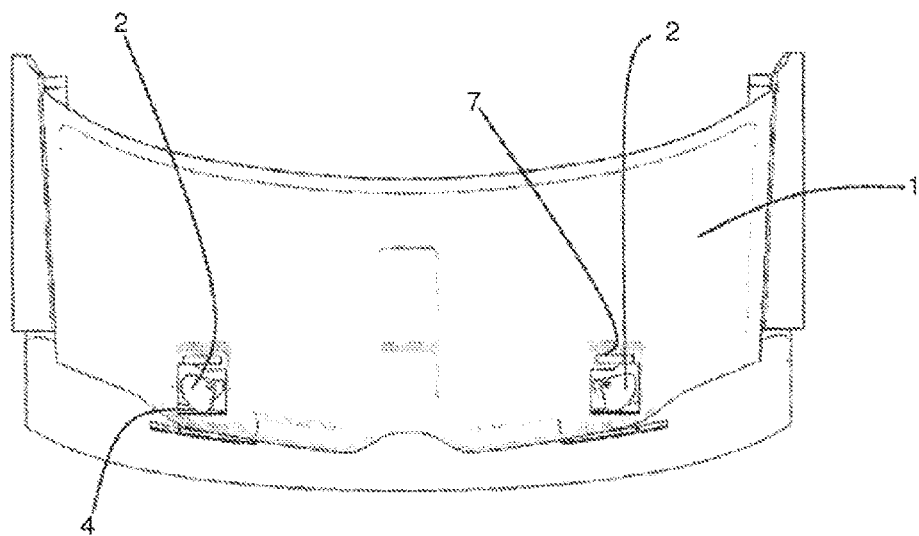
Figure 3:
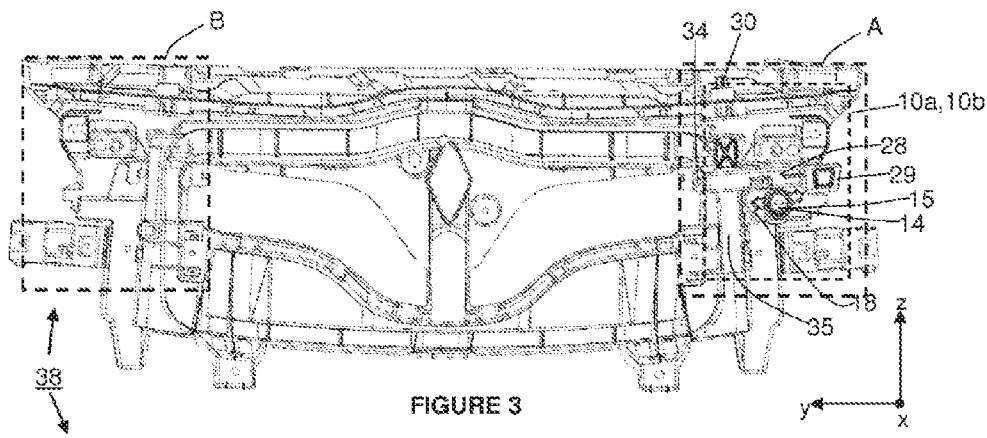
FIG. 3 represents a view of a front face of a structural element of the vehicle comprising the system for opening/closing the hood according to the embodiments of the invention.

FIG. 3 shows a front face of structural element 38 that is provided with opening/closing system 10a, 10b of the hood incorporated at the level of one side of this structural element 38 situated on part A. This part A of structural element 38 comprising opening/closing system 10a, 10b is visible on larger scale in FIG. 6.

System 10a, 10b may also be incorporated at the level of the other side of this structural element 38 located at the level of part B.

It will be noted that structural element 38 may also comprise two systems for opening/closing 10a, 10b the hood incorporated respectively at the level of parts A and B. Regardless of the configuration, opening/closing system 10a, 10b is preferably situated in the zone of the radiator grille of the vehicle.

This opening/closing system 10a, 10b is visible in particular in FIGS. 9A, 9B for the first embodiment and in FIGS. 14A, 14B for the second embodiment. This system 10a, 10b comprises, in non-limitative and non-exhaustive manner:

- a manual maneuvering element 11a, 11b, also known as pallet, is in particular movable by rotation and able to control the positioning of the hood on the vehicle body, visible in FIG. 10 for the first embodiment and in FIG. 15 for the second embodiment, and
- a mechanism 37a, 37b for locking/unlocking manual maneuvering element 11a, 11b, visible in FIG. 11 for the first embodiment and in FIG. 15 for the second embodiment. Manual maneuvering element 11a, 11b is incorporated in structural element 38 in such a way that it is movable by rotation. This manual maneuvering element 11a, 11b comprises a member 35 provided in each of the embodiments with two ends 30, 31, visible in FIGS. 9A, 9B and 10 for the first embodiment and in FIGS. 14A, 14B and 15 for the second embodiment. This member 35 may have substantially cylindrical shape and be hollow while being provided with reinforcing ribs 36 intended to make it more rigid.

Figure 4:
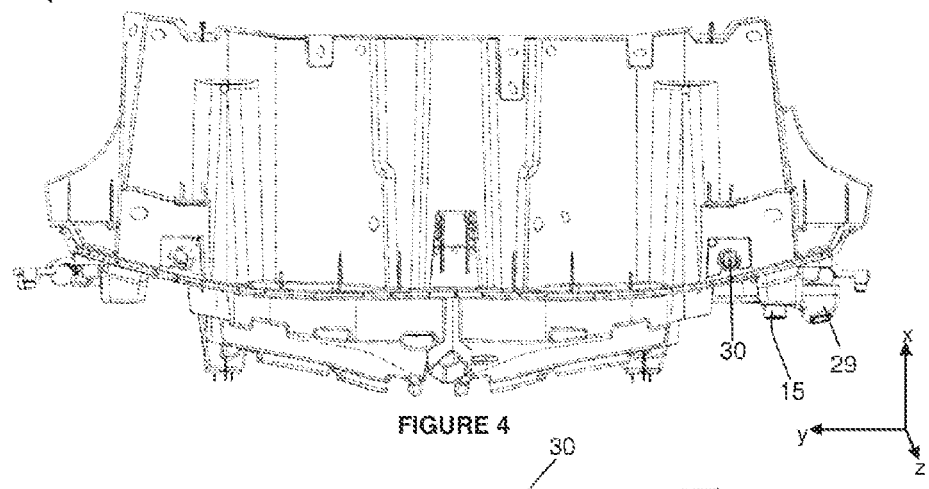
FIG. 4 is a view from above of the structural element of the vehicle comprising the system for opening/closing the hood according to the embodiments of the invention.
Figure 5:
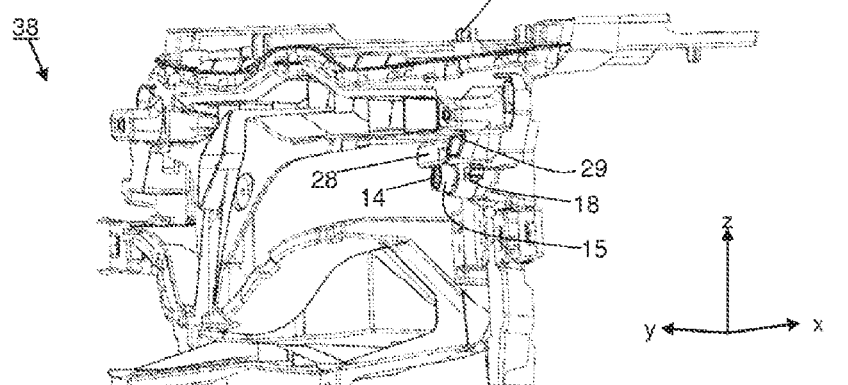
FIG. 5 is a profile view of the structural element of the vehicle comprising the system for opening/closing the hood according to the embodiments of the invention.
Figure 12:
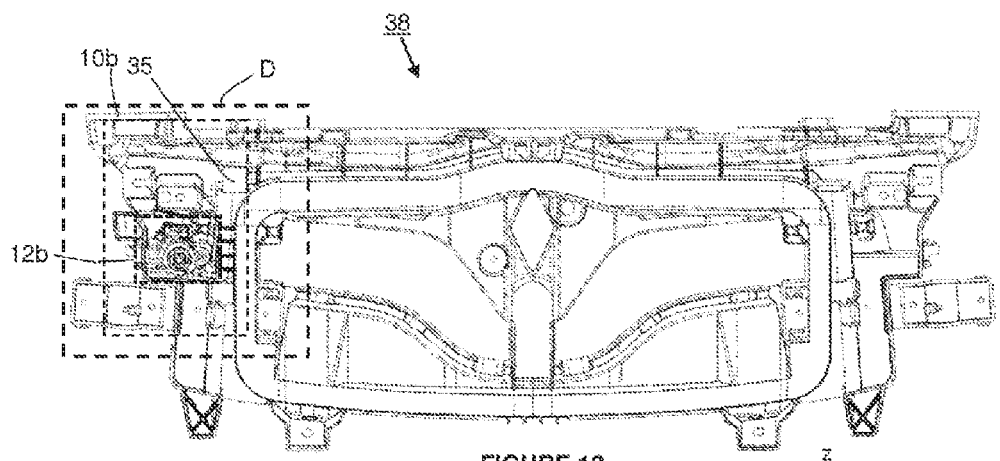
FIG. 12 is a view of a rear face of the structural element of the vehicle comprising the system for opening/closing the hood according to the second embodiment of the invention.
Figure 13:
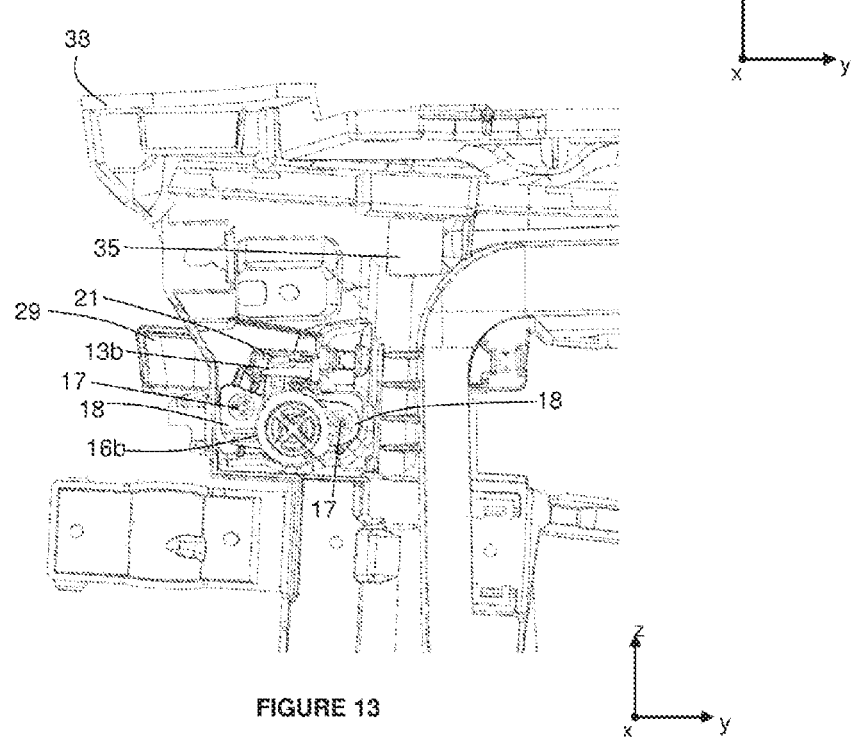
FIG. 13 is a larger-scale view of a part D of FIG. 12 according to the second embodiment of the invention.

First end 31 of member 35 is incorporated in a seat of structural element 38, and second end 30, which is visible in FIGS. 4, 5 and 6, passes through an upper wall of structural element 38. This second end 30 is able to receive a constitutive drive element (not represented) of manual maneuvering element 11a, 11b. As is well known from the prior art, this drive element, by comprising a cam surface, is able to act on a bracing element (not represented) of the hood in order to achieve positioning thereof on the vehicle body and to assure blocking thereof on this body or conversely unblocking thereof as a function of manipulations performed at the level of manual maneuvering element 11a, 11b.

Manual maneuvering element 11a, 11b also comprises an actuating element 28 incorporated substantially in the middle of its member 35 and extending substantially perpendicular relative to an axis E, F of this member 35.

Actuating element 28 also comprises two ends. A first end provided with a gripping element 29 and a second end comprising a first latching element 34, especially a clip.

Gripping element 29 makes it possible to manipulate manual maneuvering element 11a, 11b in order to vary, by rotation, the position of the drive element that is able to cooperate with the bracing element. This gripping element 29 is visible in particular in FIGS. 9A, 9B and 10 for the first embodiment and in FIGS. 14A, 14B and 15 for the second embodiment. Gripping element 29 may be manipulated from an opening, which may be incorporated in the radiator grille of the vehicle. This opening being able to be closed by a flap.

First latching element 34 situated at the level of the second end of actuating element 28 makes it possible, by cooperating with a seat having a complementary shape incorporated in structural element 38, for manual maneuvering element 11a, 11b to remain in open position when actuating element 28 has been manipulated to cause opening of the hood. This reversible holding of manual maneuvering element 11a, 11b in this position being able to be achieved by snap-fastening.

At the level of its surface facing the wall of structural element 38 when opening closing system 10a, 10b is in closed position, as in FIG. 6 for example, actuating element 28 also comprises a second latching element 32. This second latching element 32 is visible in FIGS. 9B and 10 for the first embodiment and in FIGS. 14B and 15 for the second embodiment. This second latching element 32 is able to cooperate with a latching element having a shape complementary to that of this second latching element 32 and is incorporated in a seat of structural element 38. This cooperation between the attachment element and second latching element 32 makes it possible to assure reversible holding of manual maneuvering element 11a, 11b in closed position when actuating element 28 has been manipulated to cause closing of the hood. This reversible holding of manual maneuvering element 11a, 11b in this position may be achieved by snap-fastening.

As we have seen in the foregoing, opening/closing system 10a, 10b also comprises mechanism 37a, 37b for locking/unlocking the hood. This mechanism 37a, 37b is provided to prevent/permit the rotation of manual maneuvering element 11a, 11b around its axis E, F. This mechanism 37a, 37b comprises two corresponding parts 12a, 12b, 13a, 13b, which are able to cooperate with one another to ensure blocking/unblocking of the said manual maneuvering element 11a, 11b.

First part 12a, 12b of this mechanism 37a, 37b is visible in FIG. 11 for the first embodiment and in FIG. 16 for the second embodiment. In both embodiments, first part 12a, 12b of this mechanism 37a, 37b comprises a connecting module 15, a movable arm 16a, 16b and a device 14 for control of movable arm 16a, 16b.

Movable arm 16a, 16b, also known as beater, comprises a member wherein one part 19a, 19b has substantially cylindrical shape and comprises two fixation zones 25, 27, which may be coaxial. First 25 and second 27 fixation zones are respectively able to achieve a mechanical connection with control device 14 and connecting module 15. The other part 20a, 20b of this member, which has substantially elongated shape, is provided to cooperate with second part 13a, 13b of locking/unlocking mechanism 37a, 37b.

In the second embodiment, this second part 20b of movable arm 16b comprises a free end 21 that is curved, visible in FIG. 16.

In these embodiments, control device 14 corresponds, for example, to a bolt capable of being actuated by a key. While being actuated in this way, the bolt is then able to cause a rotary movement of movable arm 16a, 16b relative to connecting module 15. More precisely, this device 14 comprises, at one end, an opening 24 capable of receiving the key and, at the opposite end, a connecting element 23 that is able to be assembled with movable arm 16a, 16b at the level of first fixation zone 25.

In these two embodiments, connecting module 15 is formed by a cylindrical hollow member, by means of which control device 14 and first fixation zone 25 are included when this connecting module 15 is mounted on movable arm 16a, 16b. One end 26 of this hollow member comprises connecting elements that are capable of assuring a mechanical connection with movable arm 16a, 16b at the level of second fixation zone 27. This module 15 comprises, at the level of the periphery of its outer wall, fixation supports 18, in this case two, which are comprised in a plane perpendicular to axis G, H of the member of connecting module 15. These fixation supports 18 are able to cooperate with fixation components 17 in order to assure a mechanical connection with structural element 38. To achieve this, they each comprise an orifice 22, through which each fixation component 17, such as a screw, is inserted and fixed in structural element 38.

As we have seen, locking/unlocking mechanism 37a, 37b comprises second part 13a, 13b. This second part 13a, 13b is able to cooperate with movable arm 16a, 16b, more precisely with second part 20a, 20b of this movable arm 16a, 16b.

In the first embodiment, second part 13a of this mechanism 37a, which is visible in FIG. 10, comprises a stop 13a, which is incorporated at the level of axis E of member 35 of manual maneuvering element 11a. This stop 13a is incorporated on member 35 of manual maneuvering element 11a between actuating element 28 and first end 31 of manual maneuvering element 11a, more precisely close to actuating element 28. This stop 13a has a shape that is complementary to a free end of second part 20a of movable arm 16a.

In the second embodiment, this second part 13b of the mechanism is visible in FIG. 15 and corresponds to a stop 13b, which has a U-shape, close to that of a hook. This shape of stop 13b is complementary to that of free end 21 of movable arm 16b. The cooperation between movable arm 16b and stop 13b makes it possible to furnish a torque that resists the force that tends to oppose a torque applied manually to axis F of manual maneuvering element 11b.

This stop 13b is incorporated on the same surface of actuating element 28 as second latching element 32. Incidentally, it will be noted that this second latching element 32 is situated on actuating element 28 between this stop 13b and member 35 of manual maneuvering element 11b.

The present invention is not limited to the embodiments that have been explicitly described, but it includes diverse variants and generalizations thereof contained within the scope of the following claims.

The invention claimed is:

1. A system for opening and closing a vehicle hood, comprising:
  a manual maneuvering element including a cylindrical member that is rotatable around an axis to control positioning of the hood on a vehicle body and an actuating element extending out from the cylindrical member in a direction substantially perpendicular to the axis of the cylindrical member; and
  a mechanism for locking and unlocking the manual maneuvering element that is separate from the manual maneuvering element and configured to rotate around an axis independently from the manual maneuvering element, the mechanism for locking and unlocking comprises:
    a connecting module formed by a hollow cylindrical member,
    a control device positioned within the hollow cylindrical member and including a key hole at the first end of the hollow cylinder member leading to a lock cylinder, and
    a movable arm rotatably attached to a second end of the hollow cylindrical member, and the movable arm is rotatable to directly contact the cylindrical member of the manual maneuvering element to prevent rotation of the manual maneuvering element.

2. The system according to claim 1, wherein said actuating element is a lever.

3. The system according to claim 1, wherein the manual maneuvering element and the connecting module are mounted in a structural element of the vehicle.

4. The system according to claim 3, wherein the structural element of the vehicle is a bulkhead reinforcement.

5. The system according to claim 3, wherein the connecting module is able to connect the movable arm and the control device to the structural element of the vehicle.

6. The system according to claim 1, wherein the mechanism for locking and unlocking comprises a stop incorporated on the cylindrical member between the actuating element of the manual maneuvering element and a first end of the cylindrical member.

7. The system according to claim 6, wherein the first end of the cylindrical member is incorporated in a seat of a bulkhead reinforcement and a second end of the cylindrical member passes through the bulkhead reinforcement.

8. The system according to claim 1, wherein the manual maneuvering element is movable by rotation.

9. A vehicle, comprising:
  the system according to claim 1.

10. The system according to claim 1, wherein the axis of the mechanism for locking and unlocking the manual maneuvering element and the axis of the control device are not co-axial.

11. The system according to claim 1, wherein the mechanism for locking and unlocking the manual maneuvering element is positioned entirely below the actuating element.

* * * * *